C. ALLEN.
FEED SPOUT BARRIER.
APPLICATION FILED JULY 23, 1918.
1,374,625.
Patented Apr. 12, 1921.
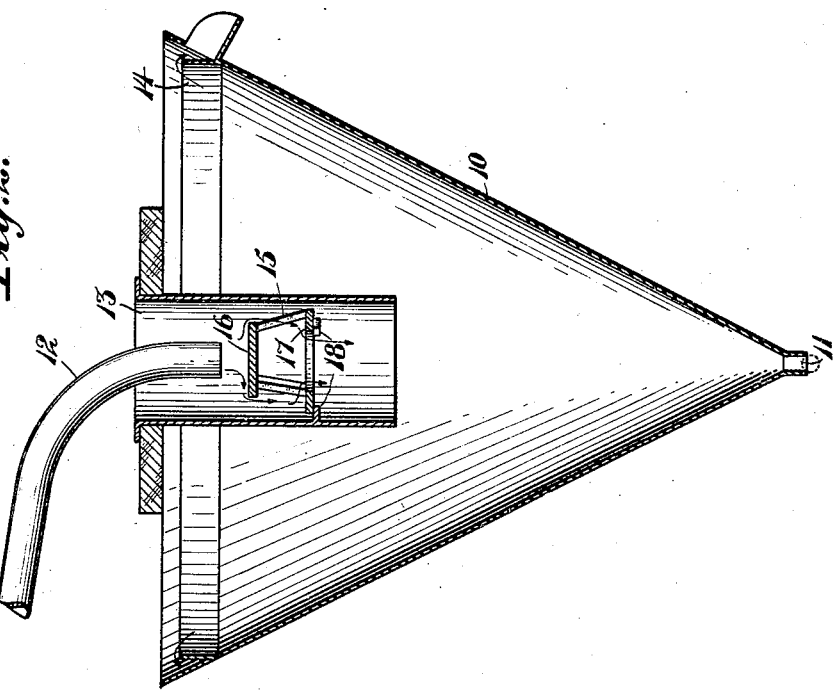
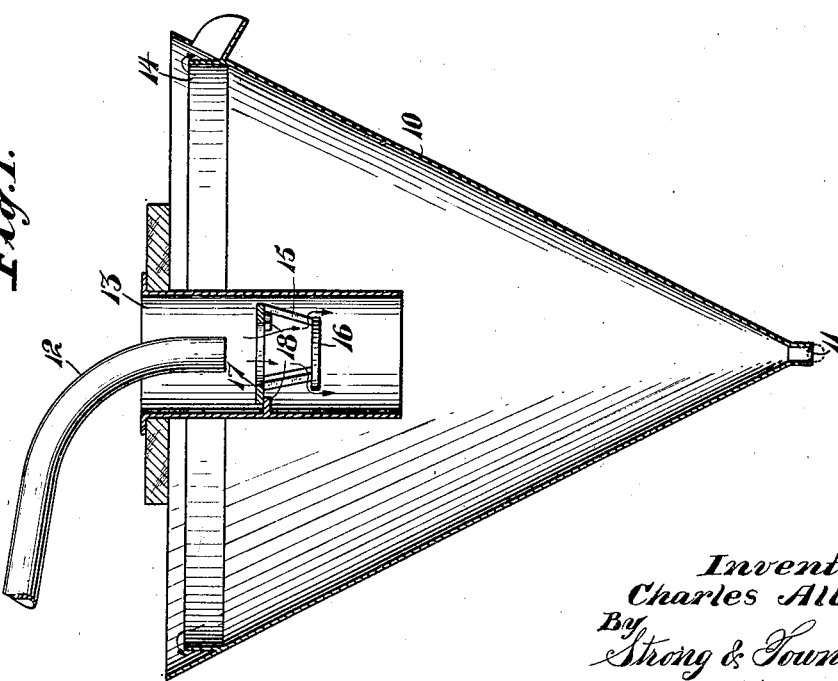
Inventor
Charles Allen
By
Strong & Townsend
Attorneys

UNITED STATES PATENT OFFICE.

CHARLES ALLEN, OF EL PASO, TEXAS.

FEED-SPOUT BARRIER.

1,374,625.  Specification of Letters Patent.  Patented Apr. 12, 1921.

Application filed July 23, 1918. Serial No. 246,366.

*To all whom it may concern:*

Be it known that I, CHARLES ALLEN, a citizen of the United States, residing at El Paso, in the county of El Paso and State of Texas, have invented new and useful Improvements in Feed-Spout Barriers, of which the following is a specification.

This invention relates to a feed spout barrier for slime thickeners, settling tanks, separating tanks and the like.

In the operation of slime thickeners and other apparatus of kindred nature, it is highly essential that the inflowing liquid should be delivered to the tank without excessive agitation of the body of liquid therein, and especially without objectionable agitation of the surface of the liquid, in which case the settling action would be dissipated and the overflowing fluid would carry particles of solid matter which should be recovered. It is therefore the principal object of this invention to provide means for delivering fluid to a settling tank whereby minimum agitation and ebullition will take place incident to the entry of the fluid into the tank.

In carrying out the present invention means are disposed within the feed spout and are arranged to provide alternate peripheral and axial barriers over and around which the fluid must pass, and by which the force of its flow will be broken at the same time liberating from it the air entrained therein.

The invention is illustrated by way of example in the accompanying drawings in which—

Figure 1 is a view in central vertical section illustrating the application of the barrier to the feed spout of a slime thickening tank.

Fig. 2 illustrates the structure disclosed in Fig. 1 with the barrier inverted in its position within the feed spout.

Referring more particularly to the drawings, 10 indicates a settling tank here shown as conical in sectional formation and disposed in an inverted position. As is common, the lower end of the tank is provided with an outlet opening, 11, through which the material within the tank may be withdrawn. Liquid may be fed to the tank through an inlet pipe, 12. This pipe in the present instance empties into a central feed spout, 13, here shown as cylindrical in section and vertically positioned along the central axis of the tank. Circumscribing the central feed spout and resting upon the inner wall of the tank is shown a ring, 14, over which the fluid may flow into an outlet passage way formed between the ring and the upper portion of the tank proper.

In the present instance the central feed spout 13 is of a length to project below the surface of the liquid within the tank and therefore prevents the splashing of the inflowing liquid and the violent agitation incident thereto. There is sufficient agitation, however, to decrease the efficiency of the apparatus, and in view thereof a feed spout barrier unit 15, is provided. This unit consists of one or more circular disks, 16, connected to and spaced from one or more rings, 17. These disks and rings are arranged along a common vertical axis and thus insure that the opening through the rings will register with the body portion of the disks. By this arrangement the inflowing liquid will be diverted from a vertical course of travel and will be caused to alternately pass toward the center of the central feed spout and then outwardly around the disk. It will be evident that this operation may be reversed, as shown in Fig. 2, and the liquid caused to first pass outwardly around the disk and then inwardly through the central opening in the ring. In either case, this action will dissipate the force of the falling liquid and cause it to be slowly fed into the tank.

It will be noted that this action also will retard the stream and change its formation in a manner to liberate any air which might be entrained therein, and by this means prevent ebullition upon the surface of the liquid within the tank.

It will be understood that desirable results may be accomplished by duplicating the units as here shown, and that such a construction would merely multiply the retarding action of the baffle members and permit the device to accommodate inflowing streams of various pressures and capacities.

As the barrier is preferably made with its elements integral, it may be inserted or removed from the spout without difficulty. In the present instance a series of inwardly projecting lugs, 18, are provided to engage the ring of the barrier and support it in its intended position within the spout. It will be observed that the outer diameter of the ring is greater than the diameter of the disk, and that the dimensions of the lugs will permit the disk to pass between them to allow the barrier to rest upon the lugs. This would be true in either position the barrier assumes and therefore makes it possible to readily invert the device when occasion demands.

In operation the barrier is disposed in either of the positions shown in the drawings and in the first position will cause the down pouring liquid to be collected and to pass through the central opening in the ring. Here it will strike the disk and will be dispersed radially therefrom to flow thereover and to assume a downward path of travel into the liquid within the tank. In the form of the device shown in Fig. 2 the liquid will first strike the central baffle disk, 16, and will pass therearound to flow through the central opening in the ring, again assuming a continuous stream.

It will thus be seen that the device here disclosed, while simple in operation and readily applied, will positively affect the inflowing stream of liquid to dissipate its force and rid it of entrained air, thus reducing the agitation of the body of liquid to a minimum as effected by the inflowing stream.

Having thus described my invention, what I claim and desire to secure by Letters Patent is:

In a separator for solids suspended in liquid, the combination with a settling tank, having an overflow periphery for the lighter product and a discharge orifice at the bottom for the heavier product, an open-ended feed spout centrally disposed at the top of the tank and extended an appreciable distance below the level of the contents of the tank, means for introducing a feed stream into said feed spout, and a barrier arranged in said feed spout and normally submerged, said barrier comprising a ring and a disk spaced vertically apart, the ring being of greater diameter than the disk, said ring and baffle being interconnected, and lugs on the interior of the feed spout to removably receive and support the ring.

In testimony whereof I have hereunto set my hand in the presence of two subscribing witnesses.

CHARLES ALLEN.

Witnesses:
ARTHUR H. SWETT,
J. L. ELY.